W. F. BOUSMAN.
OIL FILTER.
APPLICATION FILED FEB. 15, 1908.

901,418.

Patented Oct. 20, 1908.
2 SHEETS—SHEET 1.

Witnesses
R. L. Williams
C. B. Noble

Inventor
William F. Bousman
By Ithiel J. Cilley
Attorney

W. F. BOUSMAN.
OIL FILTER.
APPLICATION FILED FEB. 15, 1908.

901,418.

Patented Oct. 20, 1908.

2 SHEETS—SHEET 2.

Witnesses
R. L. Williams
C. B. Noble

Inventor
William F. Bousman
By Ithiel J. Cilley
Attorney

UNITED STATES PATENT OFFICE.

WILLIAM F. BOUSMAN, OF GRAND RAPIDS, MICHIGAN.

OIL-FILTER.

No. 901,418.  Specification of Letters Patent.  Patented Oct. 20, 1908.

Application filed February 15, 1908. Serial No. 416,115.

*To all whom it may concern:*

Be it known that I, WILLIAM F. BOUSMAN, a citizen of the United States, residing at Grand Rapids, in the county of Kent and State of Michigan, have invented certain new and useful Improvements in Oil-Filters, of which the following is a specification.

Figure 1:
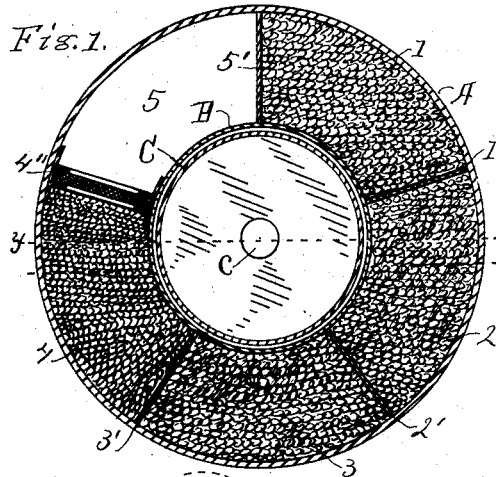
Figure 2:
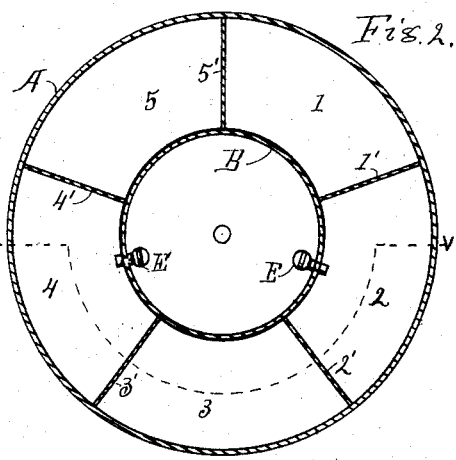
Figure 3:
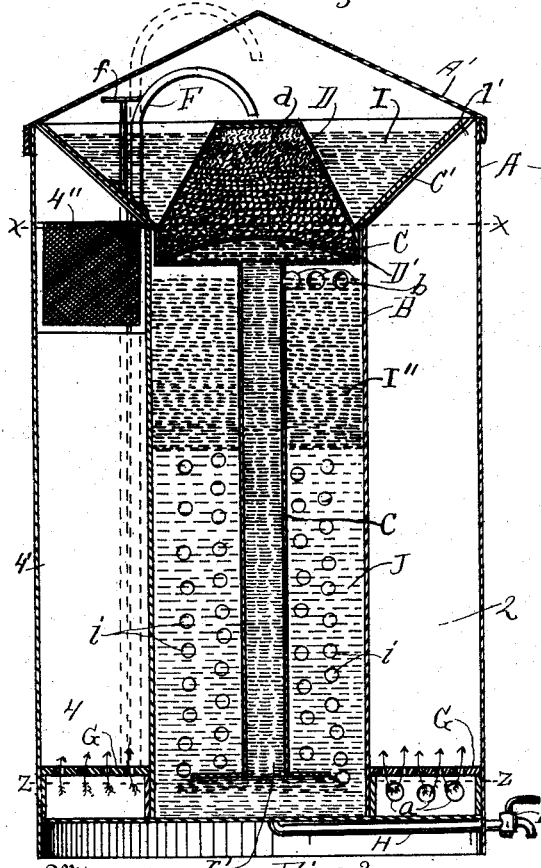
Figure 4:
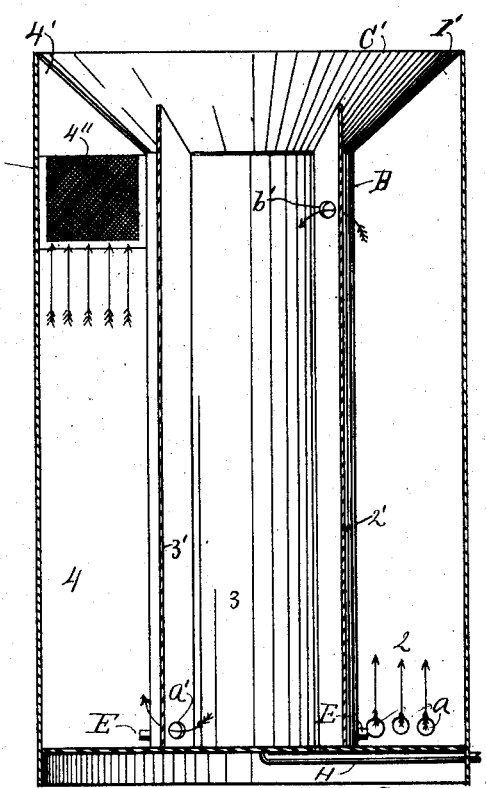
Figure 5:
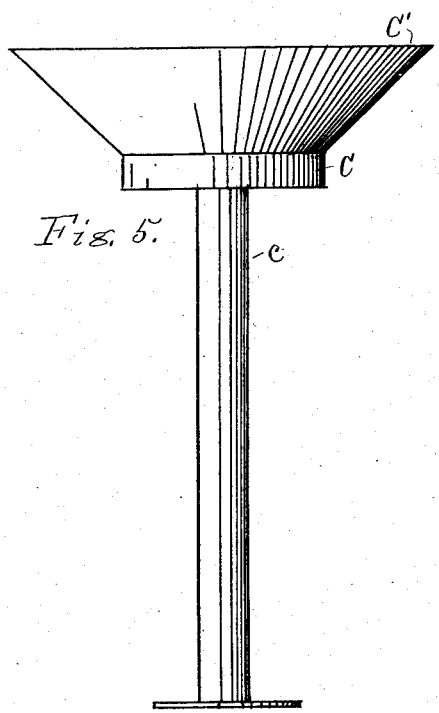
Figure 6:
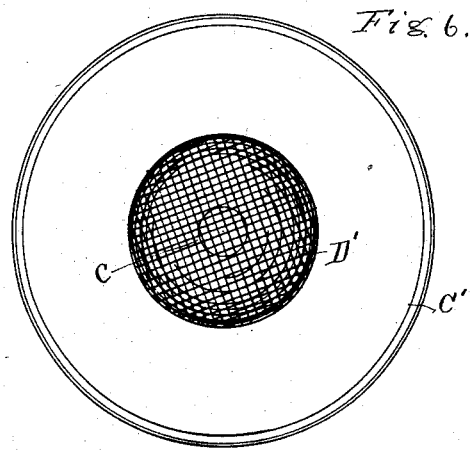
Figure 7:
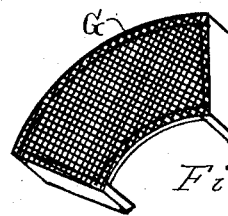
Figure 8:
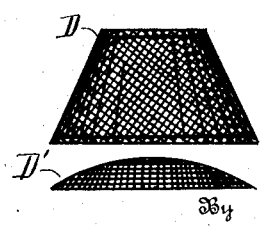

My invention relates to improvements in oil filters for purifying oil that has been once used, and its object is to provide a filter that will cleanse oil thoroughly, and that can be drained and cleaned without being taken to pieces or badly disarranged. I attain this object by the mechanism illustrated in the accompanying drawing, in which Figure 1 is a transverse section of the filter on the line $x$ $x$ of Fig. 3. Fig. 2 is the same on the line $z$ $z$ of Fig. 3. Fig. 3 is a vertical section of the same on the line $y$ $y$ of Fig. 1. Fig. 4 is the same on the line $v$ $v$ of Fig. 2. Fig. 5 is an elevation of the settling tube and funnel. Fig. 6 is a top plan of the same. Fig. 7 is a perspective of a screen support designed to be placed at the bottom of the outer compartments of the filter to support the waste or filtering material that is placed in the compartments, and Fig. 8 is an elevation of the screen that covers the filtering material in the oil receiving cone, and of the screen that covers the tube that extends down into the central compartment of the filter, showing their relative positions.

Similar letters refer to similar parts throughout the several views.

This filter is constructed of metal, circular in form and divided into a series of outer compartments with a cylindrical central compartment, as shown in Figs. 1 and 2 and it is operated as follows: I first place a screen D′ in the bottom of the receptacle C of such form and in such a position that it will support the cotton waste $d$, or such other material as may be used for first filtering the oil, and will leave a considerable clear space for oil between the screen and the bottom of the receptacle, and cover this with a compact pile of waste $d$, over which I place a screen, as D, so that the waste will be held to place in a compact body while the oil is passing through it. The upper portion of the compartment C is made flaring, as indicated at C′, and into this I place the foul oil I which filters through the waste $d$ and down into the tube $c$ which extends well down into the central compartment, B, of the filter.

The compartment B is filled half or two thirds full of water, as indicated at J, and the oil I is drawn down through the tube $c$, by gravity, to the bottom of the tube, as indicated at I′, when it percolates through the water in small drops, as indicated at $i$, rising to the top of the water and resting at I″, whence it passes through the openings $b$ at the top of the chamber B, into the outer chambers through which it passes as follows: There may be as many of these outer chambers as may be desired. In this case I have shown five outer chambers, the first four of which are represented as filled with some efficient filtering material, as cotton waste, &c., and these compartments are divided by partitions through which the oil passes at the top and bottom, alternately, thus: The oil passes out of the top of the central compartment B through the openings $b$ into the compartment 1 where it percolates through the filtering substance to the bottom of the compartment and through the screen G, that supports the filtering substance some distance above the bottom of the compartment, where the oil passes through the openings $a$ in partition 1′ into compartment 2 where it passes up through the filtering substance to the openings $b'$ whence it passes through the partition 2′ into compartment 3 and down through the filtering substance in this compartment to the bottom, where it passes through the openings $a'$, in the partition 3′, into compartment 4 and up through said compartment to the felt screen 4″ in the partition 4′ where the oil, now as nearly pure as it is possible to make it, passes through this screen into compartment 5 which has no filtering material in it but is left clear for the storage of the purified oil, and for drawing the oil from this compartment I make use of an ordinary telescoping pump, as indicated at F $f$ in Fig. 3. The partition, 5′, between compartments 1 and 5 has no openings through it for the passage of oil and as the oil that reaches compartment 5 is rendered pure I have made no provisions for cleaning this compartment, though I have made such provision for cleaning the other four compartments, as follows: I place a valve E in compartments 2 and 4, so arranged that they may be opened or closed by means of a key, by removing the funnel C' c and passing the key down into the central compartment B to the heads of the valves. This will allow the oil and settlings to flow out of compartments 1, and 2 through one valve, and from 3 and 4 through the other valve, and may be, finally, drawn from compartment B through the pipe H and faucet H'.

I prefer to have a screen G placed in the bottom of each of the first four outside compartments so that there will be a clear space at the bottom of each for the free flow of oil from 1 to 2 and from 3 to 4, the oil being caused to take the course through the several compartments indicated by the arrows in Figs. 3 and 4. The screens G may be made of any form of screening or of wood with small holes through it, as indicated in Fig. 3, though I prefer the screening shown in Fig. 7.

By using the screen D and filtering material d in the oil receptacle I avert the danger of heavy, large particles of sediment passing down through the tube c into the central compartment, and thus save a great deal of unnecessary labor, as it is much easier to remove and clean the filtering appliance in the oil receptacle than it would be to have to remove the entire receptacle and tube and work through or remove the water and oil in the central compartment to clean the sediment from the bottom. With my construction it is necessary to clean the bottoms of the several compartments only at long intervals, as only the finest of the sediment can pass through the filter d.

When it is desired to put oil into the receptacle, or to take oil out of the tank the cover A' may be removed by simply raising it off of the tank, and the pump F, which is securely fastened to the wall of the receptacle, may be raised, as indicated by its dotted lines in Fig. 1, to the desired height to fill any can or other desired receptacle.

As it may be necessary to replace the screen 4'' I prefer that the partition be provided with a double wall at the top, as indicated in Fig. 1, so that the screen may be pressed between the sides so that there will be no danger of any sediment passing around the screen into the fifth or last compartment of the tank.

I prefer that the top of the screen D be made of some solid material, as wood, so that a can may be placed upon it for receiving oil from the pump F, and the cover A' of the tank may be hinged upon the tank, if desired, but as this is a common means of securing covers to cans or tanks I do not deem it necessary to show the same in the drawing, especially as this particular feature does not form any element that may be claimed as part of my invention.

I claim:

1. In an oil filter, a tank having an outer and an inner annular wall forming a central cylindrical compartment and an annular outer compartment, partitions connecting the outer wall and the inner wall and dividing the annular compartment into several smaller compartments, partition 1' being provided with a passage way near the bottom of the tank connecting the first and second compartments, partition 2' being provided with a passage way near the top of the tank connecting compartments 2 and 3, partition 3' provided with a passage way near the bottom connecting compartments 3 and 4, and partition 4' being provided with a passage way near the top and a fine filtering substance in said passage way, filtering material in compartments 1, 2, 3 and 4, a supporting screen in each of said compartments below the filtering material the central annular wall having openings near the top connecting the central compartment and compartment 1, an oil tube supported at the top of the tank and extending down into the central compartment, an oil receptacle above the oil tube and water in the central compartment to wash the oil before it passes into the outer compartments.

2. In an oil filter, annular walls forming an inner cylindrical compartment and an outer annular compartment, partitions connecting said walls and dividing the annular compartment into several smaller compartments, the inner wall having openings connecting the inner compartment and compartment 1, partition 1' having openings near the bottom, 2' having openings near the top, 3' having openings near the bottom, and 4' having an opening near the top, forming an indirect passage way from the central compartment through the outer compartments to compartment 5, a felt screen in the opening in partition 4', screens in the bottom of the first four outer compartments, filtering material in said compartments above the screens, an oil receptacle in the top of the filter, a screen in said receptacle, filtering material in said screen, a screen below said filtering material forming a chamber in the bottom of the receptacle, a central tube extending down from the receptacle into the central compartment, said central compartment being partly filled with water for washing the oil as it passes through.

3. In an oil filter, a tank having annular walls arranged to form a cylindrical central compartment and an annular outer compartment, partitions connecting the walls and dividing the outer compartment into several compartments, partitions 1' having openings near the bottom, 2' having openings near the top, 3' having openings near the bottom and 4' having an opening near the top, a filtering screen in said opening, said openings forming a passage way from the central compartment through compartments 1, 2, 3, 4 and into 5, screens near the bottoms of compartments 1, 2, 3 and 4 and a filtering substance in said compartments above the screens, an oil receptacle in the top of the filter, a screen and filtering material in said receptacle, a tube extending down from said receptacle into the central compartment, said central compartment partly filled with water, valves in the inner wall for opening passages between the outer and the inner compartments, and a pipe and faucet for draining the several compartments.

4. In an oil filter, a tank formed with two annular walls forming a cylindrical central compartment and an annular outer compartment, partitions connecting the inner and the outer walls dividing the annular compartment into several smaller compartments, the inner wall having openings near the top between the inner compartment and compartment 1, the partitions between the outer compartments having openings alternately at the bottoms and the tops, filtering material in all but one of the outer compartments, the inner compartment partly filled with water, an oil receptacle above the several compartments, a screen and filtering material centrally confined in the oil receptacle, and a tube extending down from the center of the oil receptacle into the water in the central compartment, and valves and pipes for draining the compartments.

5. In an oil filter, a tank formed with annular walls arranged to form a central cylindrical compartment and an annular outer compartment, radiating partitions dividing the annular compartment into several smaller compartments, the inner wall and the several partitions having openings arranged to cause the oil to travel the length of each compartment before entering the next succeeding compartment, an oil receptacle above the compartments, screens centrally located in the receptacle, filtering material confined between said screens, a tube extending down from the receptacle into the central compartment, the central compartment partly filled with water, for washing the oil, screens in the bottom of the outer compartments, valves and pipes for draining the compartments, and a telescoping pump secured to the oil receptacle and extending into one of the outer receptacles for pumping out the oil, all substantially as and for the purpose stated.

Signed at Grand Rapids Michigan February 11th 1908.

WILLIAM F. BOUSMAN.

In presence of—
H. G. EVANS,
BERTRAM M. FOX.